Patented Jan. 20, 1925.

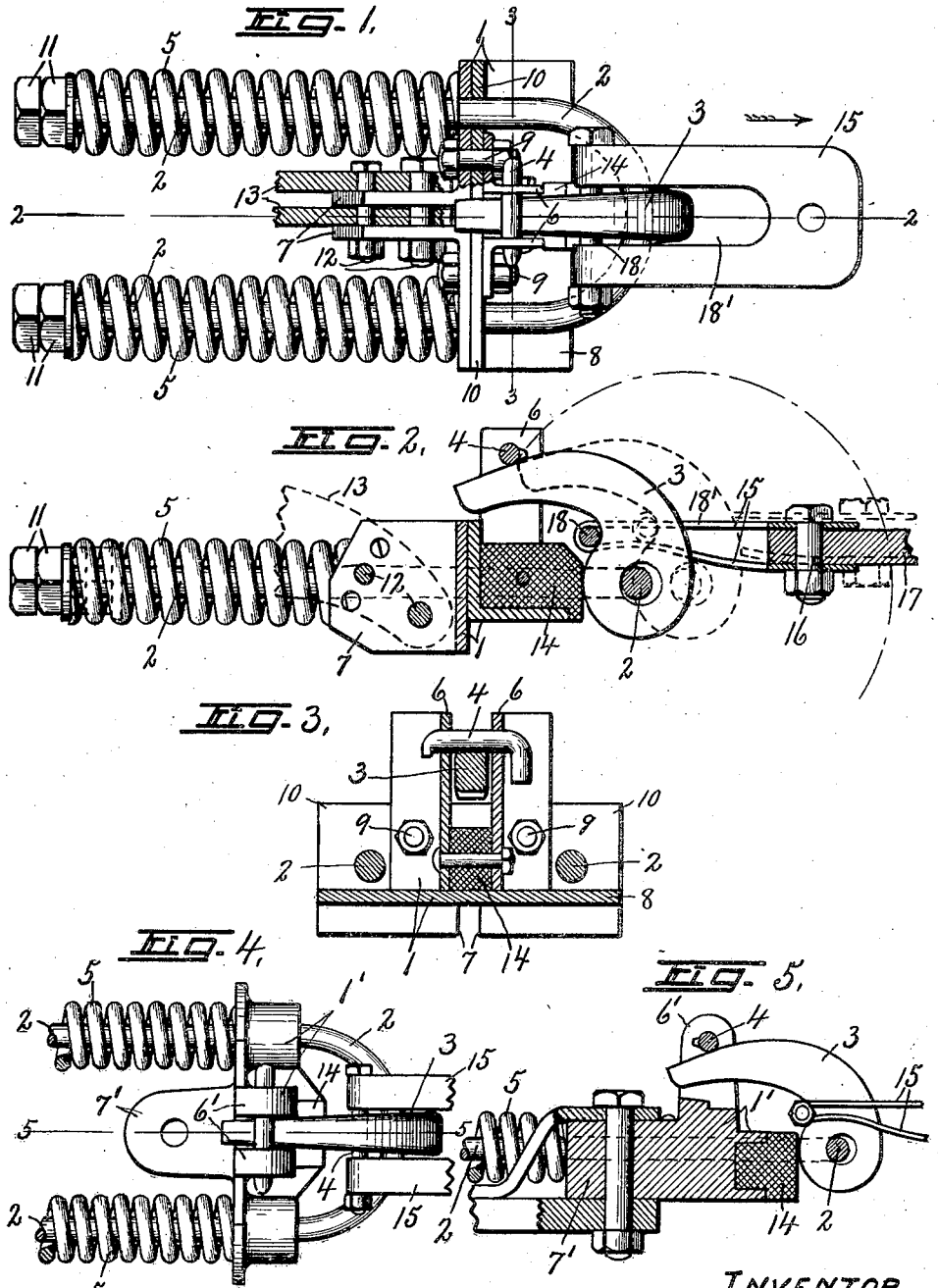

1,523,646

UNITED STATES PATENT OFFICE.

GEORGE W. HOWDEN, OF POMPEY, NEW YORK.

SELF-RELEASING DRAFT DEVICE.

Application filed January 10, 1924. Serial No. 685,395.

*To all whom it may concern:*

Be it known that I, GEORGE W. HOWDEN, a citizen of the United States of America, of Pompey, in the county of Onondaga, in the State of New York, have invented new and useful Improvements in Self-Releasing Draft Devices, of which the following, taken in connection with the accompanying drawings, is a full, clear, and exact description.

This invention relates to a self-releasing draft coupling for connecting plows and other implements to motor tractors and analogous machines for the purpose of preventing overstraining of any of the coupled or coupling parts in case of excessive resistance to the draft of the propelled object by the propeller.

These coupling members are spring-pressed in opposite directions to act resiliently in opposition to the load and the main object of the present invention is to provide one of the coupling members with a pivoted draft dog in sliding engagement with a part of the other member whereby excessive load overcoming the spring tension or pressure will cause the pawl to disengage said part and thereby to release the coupling from the propelled object.

Another object is to provide one of the coupling members with a buffer located in the path of movement of the portion of the draft to prevent excessive shock or jambing of the coupling members by the action of the retracting springs.

A further object is to construct the draft block with forwardly and rearwardly projecting sets or pair of flanges for the reception of the attaching means for the propeller and for receiving and guiding the free end of the draft dog and its holding pin respectively, and to locate these flanges along the center line of draft and midway between the retracting springs for the U-shaped draft member.

Other objects and uses relating to specific parts of the coupling will be brought out in the following description.

In the drawings:—

Figure 1 is a top plan of a draft coupling embodying the various features of my invention, portions of the draft block and object to be drawn being shown in section, the parts being shown in operative position.

Figure 2 is a longitudinal sectional view taken on line 2—2, Figure 1, showing the rear end of a tractor or other propeller connection in section, the dotted lines indicating the releasing position of the coupling members.

Figure 3 is a transverse vertical sectional view taken on line 3—3, Figure 1.

Figure 4 is a top plan of a portion of a draft coupling showing a modified form of draft block, and Figure 5 is a sectional view taken on line 5—5, Figure 4.

The construction shown in Figures 1 to 3 inclusive comprising a draft block —1—, a U-shaped draft bar —2—, and a draft dog —3— pivoted to the closed end of the draft bar —2— and slidably engaging a cross pin —4— on the block —1—, which together with the draft bar —2— are spring pressed in opposite directions by coil springs —5—.

The draft block —1— is provided with forwardly and rearwardly projecting pairs of flanges —6— and —7—, those of each pair being arranged in transversely spaced relation and preferably at the opposite sides of the central line of draft indicated by the line 2—2, and also substantially midway between the opposite arms of the draft bar —2—.

The main body of the draft block 1—1 preferably consists of an angle plate —8— arranged in a horizontal position with one of its flanges projecting vertically from the rear edge of the other flange while the flanges —6— and —7— are preferably formed of angle irons secured by bolts —9— to front and rear faces respectively of the upstanding flange of the plate —8—.

Or as shown in Figures 4 and 5, the draft block as —1'— may consist of a one piece casting or forging of malleable iron or steel having a rearwardly projecting flange —7'— and a pair of upwardly projecting flanges —6'—.

Each of the different forms of draft blocks are provided with guide openings —10— for receiving the opposite arms of the draft bar —2— and permitting the relative sliding movement of the block and bar one upon the other.

The bar —2— is arranged with its closed end in front of the draft block —1— and has its opposite arms extended rearwardly through the guide openings —10— and provided at their rear ends with adjusting nuts —11— for varying the tension of the springs —5— which latter are located between the inner nuts or abutments —11— and rear face of the block —1— and are tensioned to draw the closed end of the draft bar —2— rearwardly relatively to the block —1—.

The opposite arms of the draft bar —2— are preferably located at equal distances from and at opposite sides of the central line of draft and therefore, at opposite sides of the flanges —6— and —7— of each pair.

The rearwardly projecting flanges —7—, Figures 1, 2 and 3 and the flange —7'—, Figures 4 and 5 are apertured to receive one or more bolts —12— by which they may be attached to and detached from a plow beam —13— or other object to be drawn by the draft block —1—.

The draft dog —3— is preferably made in the form of a hook-shaped cam lever having one end pivoted to the central portion of the closed end of the draft bar —2— in the center line of draft of the coupling just in front of the draft block —1— and its other end normally extended rearwardly over the block —1— and between the flanges —6—, Figures 1, 2 and 3 or between the flanges —6'—, Figures 4 and 5, and is slidably engaged with the underside of the cross pin —4— which in turn is removably secured in suitable apertures in said flanges.

A suitable buffer —14— of rubber or other suitable material is secured to the front of the block —1—, Figures 1, 2 and 3 or to the front end of the block —1'—, Figures 4 and 5 directly in the path of movement of the pivoted end of the dog —3— to form a yielding stop for limiting the rearward movement of the draft bar —2— with the dog —3— thereon under the action of the springs —5— and thereby preventing jambing of the draft bar in its guide openings in the blocks —1— or —1'—.

A draft plate —15— has one end provided with a bolt —16— for securement to a draft bar —17— of a tractor or other propelling machine and its other end provided with a lengthwise slot —18— open at its rear end and adapted to receive the dog —3—, the rear end of said draft plate being provided with a bolt —18— for slidably engaging the rear face of the dog —3— between the closed end of the bar —2— and cross pin —4— when the coupling members are adjusted for use.

It is now clear that the pulling power of the tractor or other propeller is exerted directly upon the intermediate portion of the draft dog —3—, normally nearer to its fulcrum than to its free end and that this pulling force causes the upper edge of the dog —3— to ride against the underside of the cross pin —4—, thereby transmitting a similar force or power to the draft bar —2— against the action of the springs —5— while the load resistance is connected to the draft block —1— in the manner previously described.

When the draft block —1— is connected to a plow or other load and the draft bar —2— is connected to a motor tractor or other power, the power is transmitted to the load through the springs —5— which are tensioned to carry a predetermined load but are sufficiently resilient to yield under excess load, as for example, in case the object drawn should encounter an obstruction under which conditions, the draft bar would be drawn forwardly against the action of the springs, a sufficient distance to withdraw the dog —3— out of engagement with the cross pin —4— thereby releasing the dog and allowing it to rock forwardly and downwardly as the forward movement of the power continued thereby releasing the power from the rod and avoiding breakage or overstraining of any of the coupled or coupling parts.

In reconnecting the tractor with the load, the cross pin —4— is withdrawn by hand from the flanges —6— or from the flanges —6'— following which the draft plate —15— on the tractor may be placed in position to receive the dog —3— which may then be rocked upwardly and rearwardly between the flanges —6— or —6'— to engage the front face of the pin —18— whereupon the cross pin —4— may be reinserted in the apertures in the flanges —6— or —6'— to hold the pawl against forward and downward movement except when the tension of the springs is overcome by the resistance of the load while the tractor or other power is moving forward.

The coupling parts as described are particularly simple and durable and capable of being easily and quickly connected and are highly efficient in releasing the load from the power under the conditions named without liability of impairing the efficiency of any of those parts.

What I claim is:

In a self-releasing draft coupling, a draft block having guide openings at opposite sides of the center line of draft, a U-shaped draft bar having its closed end in front of the draft block and its opposite arms slidable in the guide openings and provided with abutments, coil springs surrounding said arms between the abutments and draft block, means on the draft block for attachment to the load, a cross pin slidable in guide openings on the draft block, a draft dog having one end pivoted to the closed end of the draft bar and its other end extending rearwardly under the cross pin in sliding engagement therewith, a buffer on the draft block in the path of movement of the pivoted end of the draft dog, and a draft device having its rear end slidably engaged with the inner face of the draft dog between its pivotal axis and its point of engagement with the cross pin.

In witness whereof I have hereunto set my hand this 2nd day of January, 1924.

GEORGE W. HOWDEN.

Witnesses:
  H. E. CHASE,
  RITA CAMPOLIETO.